May 27, 1941.　　　B. F. SOFFE　　　2,243,582
APPARATUS FOR SETTLING TURBID LIQUID

Filed Aug. 3, 1939

BENJAMIN F. SOFFE
*INVENTOR.*

BY *Eric Pick*

*ATTORNEY*

Patented May 27, 1941

2,243,582

UNITED STATES PATENT OFFICE 2,243,582

APPARATUS FOR SETTLING TURBID LIQUID

Benjamin F. Soffe, Detroit, Mich.

Application August 3, 1939, Serial No. 288,067

2 Claims. (Cl. 210—58)

This invention relates to apparatus for settling turbid liquid; and it comprises a settling tank having a conical bottom, an inlet for liquid near the top of the tank, a sludge outlet at the bottom of the tank, and a plurality of co-axial, closely spaced uptake funnels discharging into a common outlet for settled liquids; all as more fully described hereinafter and as claimed.

In the settling of turbid liquids it is customary to employ a tank which has a conical uptake in its lower portion. The turbid liquid is admitted at the top of the tank. As the liquid slowly flows downward, settling takes place. The settled liquid flows through the uptake to a point of use while the sludge is collected on the bottom of the tank whence it is removed from time to time. In such arrangement the settled liquid is required to turn sharply around the lower edge of the uptake so that its velocity is greatly increased. This results in a tendency to carry turbidity along so that the settled effluent is not as clear as is desirable.

In softening water by hot lime-soda treatment, for instance, the slight turbidity remaining in the settled water is further reduced by passage through filters. The filters are backwashed periodically to remove the collected sludge, and this backwashing is carried out with settled water. During backwashing the rate of flow through the uptake is increased, resulting in an increased velocity around the edge of the uptake and thus in an appreciable but undesirable increase in turbidity.

It is an object of my invention to provide an apparatus in which the velocity of the settled liquid passing into the uptake is greatly reduced to result in a clearer effluent.

Another object of my invention is to provide an apparatus which permits a temporary increase in the rate of withdrawal of settled liquid without appreciable increase in turbidity.

The manner in which these objects are achieved is illustrated in the appended drawing, in which—

Figure 1:
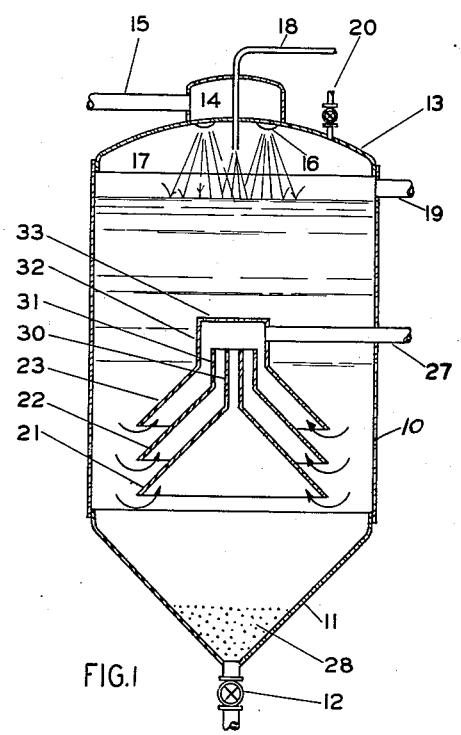
Figure 2:
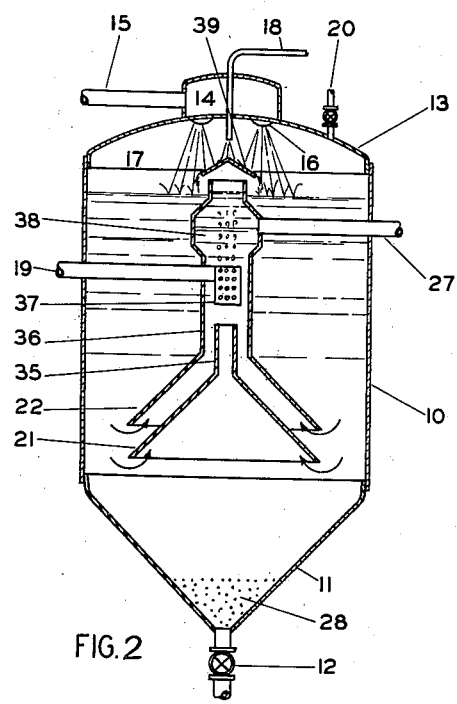

Fig. 1 is a sectional elevation, more or less diagrammatic, of an apparatus according to my invention; and Fig. 2 is a modification of the apparatus of Fig. 1.

Similar reference numerals refer to similar parts throughout the several views.

Referring now to Fig. 1, a settling tank 10 has a conical bottom 11 provided with a valved sludge outlet 12. The top 13 of the tank carries a water inlet chamber 14 having a water inlet 15 and spray heads 16 discharging into a steam space 17 in the upper portion of the tank. An inlet 18 for chemicals, e. g. lime and soda solution, discharges into the steam space 17 adjacent to the spray heads 16. The steam space 17 is provided with a steam inlet 19 and a valved vent 20.

In the lower part of tank 10 are three closely spaced uptake funnels, 21, 22 and 23 which are connected with concentric tubular members 30, 31 and 32, respectively. The outermost member 32, provided with a closed top 33, is longer than members 31 and 32, and is connected with an outlet 27 for settled water. The diameter of the funnels is advantageously of the order of 70 per cent of the diameter of tank 10 so that the funnels occupy approximately half the cross sectional area of tank 10. The angle between the sides of funnels 21 to 23 and the horizontal should be not less than the angle of repose of the sludge precipitated in tank 10, usually 45 to 60 degrees.

Operation of the apparatus shown in Fig. 1 is as follows. Water entering through inlet 15 and chamber 14 is discharged by spray heads 16 into the steam space 17 in a fine shower. It is heated by contact with steam entering through inlet 19, and mixed with chemicals entering through inlet 18. Any gases dissolved in the water and released in the heating thereof are discharged through vent 20. As the water flows slowly downward in the tank 10 reaction with the chemicals takes place. Precipitates form and move downward, collecting as sludge 28 on the conical bottom 11. This sludge is removed at intervals through sludge outlet 12. The clarified water passes into funnels 21, 22 and 23 as indicated by the arrows and thence flows through the concentric tubular members 30, 31 and 32 to outlet 27.

In Fig. 2 there are but two funnels 21 and 22. The apex of funnel 21 connects with a short tubular member 35. The apex of funnel 22 connects with a larger concentric tubular member 36 of such length as to reach into steam space 17. Within member 36 is a foraminous steam chest 37 supplied with steam through inlet 19. Above the steam chest 37 the tubular member 36 expands into a chamber 38 which is in communication with outlet 27. The open top of member 36 is protected by a hood 39 which prevents the entering of raw water or chemical. In operation, settled liquid enters the funnels 21 and 22 as shown by the arrows and passes upwardly through tubular members 35 and 36. Steam emerging from steam chest 37 bubbles up through the clarified water, and by agitation and dilution reduces further the dissolved gases entrained in the water. The clarified and deaerated water leaves through outlet 27, while the steam passes through the open top of member 36 into the steam space 17, there to heat the incoming water.

While I have described my invention with particular reference to hot process lime-soda softening of water, it may, of course, be employed in other processes involving clarification of turbid liquids, such as fruit or sugar juices, etc.

As compared with a single funnel, the use of two funnels shown in Fig. 2 reduces the velocity around the edges of the funnels to one-half, while the use of three funnels as shown in Fig. 1 reduces it to one-third. Where a further reduction in velocity with correspondingly greater clarity of effluent is desired a greater number of vertically spaced funnels may be employed. Other modifications will occur to those skilled in the art without departing from the spirit of my invention, and reference is, therefore, made to the following claims for a definition of the scope of my invention.

I claim:

1. In apparatus for settling turbid liquid comprising a settling tank having a bottom, a liquid inlet at the top of the tank, and a sludge outlet at the bottom, improved means for withdrawing settled liquid from the tank comprising a plurality of co-axial, vertically spaced uptake funnels in the lower portion of the tank, a plurality of concentric vertical tubular members, the innermost tubular member terminating in the apex of the lowermost funnel, the outermost tubular member terminating in the apex of the uppermost funnel and extending to a higher elevation than any other tubular member, and a liquid outlet for the tank communicating with the outermost tubular member.

2. In apparatus for settling turbid liquid comprising a settling tank having a bottom, a sludge outlet at the bottom, and a steam space and a liquid inlet at the top of the tank, improved means for withdrawing settled liquid from the tank comprising a plurality of co-axial, vertically spaced uptake funnels in the lower portion of the tank, a plurality of concentric vertical tubular members, the innermost tubular member terminating in the apex of the lowermost funnel, the outermost tubular member terminating in the apex of the uppermost funnel and being in free communication with the steam space, steam distributing means in said outermost tubular member, and a liquid outlet in communication with said outermost tubular member between the steam distributing means and the steam space.

BENJAMIN F. SOFFE.